United States Patent
Huang et al.

(10) Patent No.: US 9,856,871 B2
(45) Date of Patent: Jan. 2, 2018

(54) BICYCLE AIR PUMP

(71) Applicants: Chung Wei Huang, Taichung (TW); Wen-Hung Li, Tainan (TW); Cheng Yu Huang, Taichung (TW)

(72) Inventors: Chung Wei Huang, Taichung (TW); Wen-Hung Li, Tainan (TW); Cheng Yu Huang, Taichung (TW)

(*) Notice: Subject to any disclaimer, the term of this patent is extended or adjusted under 35 U.S.C. 154(b) by 328 days.

(21) Appl. No.: 14/818,303

(22) Filed: Aug. 5, 2015

(65) Prior Publication Data
US 2015/0337833 A1 Nov. 26, 2015

(51) Int. Cl.
*F04B 53/10* (2006.01)
*F04B 37/10* (2006.01)
*F04B 41/02* (2006.01)
*B60S 5/04* (2006.01)

(52) U.S. Cl.
CPC .............. *F04B 53/10* (2013.01); *B60S 5/043* (2013.01); *F04B 37/10* (2013.01); *F04B 41/02* (2013.01); *Y10T 137/3662* (2015.04); *Y10T 137/7811* (2015.04)

(58) Field of Classification Search
CPC ....... B60C 29/06; B60C 29/068; B60S 5/043; F04B 37/10; F04B 41/02; F04B 53/10; Y10T 137/36; Y10T 137/3662; Y10T 137/7811
USPC ........................ 137/224, 227, 505.28; 141/38
See application file for complete search history.

(56) References Cited

U.S. PATENT DOCUMENTS

| | | | | |
|---|---|---|---|---|
| 2,001,233 A * | 5/1935 | Anderberg | .............. | B60S 5/043 137/228 |
| 2,498,596 A * | 2/1950 | Wallach | .................... | F17C 7/00 116/DIG. 44 |
| 3,211,175 A * | 10/1965 | Replogle | .................. | A62B 9/02 137/493 |
| 3,426,790 A * | 2/1969 | Dey | ........................ | G05D 16/10 137/505.18 |
| 3,448,779 A * | 6/1969 | Horwitt | ................... | B60S 5/043 137/223 |
| 3,996,957 A * | 12/1976 | Goldish | .................. | F16K 15/20 137/224 |
| 4,168,015 A * | 9/1979 | Robinette | ............... | B60C 29/00 137/881 |
| 4,489,855 A * | 12/1984 | Boetger | .................. | B60C 23/10 141/38 |
| 4,499,914 A * | 2/1985 | Schebler | .................. | A62B 7/14 128/204.21 |

(Continued)

*Primary Examiner* — William McCalister

(57) ABSTRACT

A bicycle air pump includes an air cylinder; a joining member on the cylinder and including upper, intermediate and lower chambers, and a passageway communicating the cylinder with the lower chamber and a relief valve; an activation assembly on the joining member and including a hollow spring-loaded stem in both the intermediate chamber and the lower chamber, an end seal, a cap on the upper chamber, a push rod through the cap to urge against the seal and having an axial hole and a lateral hole communicating with the axial hole, a knob secured to the push rod and the cap, and an outlet; a pressure gauge on the joining member and communicating with the passageway; an inlet assembly secured to bottom of the cylinder and including a check valve; and a blocking member secured to bottom of the stem for blocking the passageway when in an inoperative position.

1 Claim, 8 Drawing Sheets

(56) References Cited

U.S. PATENT DOCUMENTS

| | | | | |
|---|---|---|---|---|
| 4,662,412 | A * | 5/1987 | Swallert | B60S 5/04 141/284 |
| 4,700,742 | A * | 10/1987 | Rosaen | F16K 17/32 116/275 |
| 4,730,637 | A * | 3/1988 | White | E03B 7/12 137/468 |
| 4,909,269 | A * | 3/1990 | Pritchard | G05D 16/10 137/505.28 |
| 4,969,493 | A * | 11/1990 | Lee | B60S 5/043 137/227 |
| 5,316,055 | A * | 5/1994 | Brimmer | B60C 23/10 141/17 |
| 5,329,975 | A * | 7/1994 | Heitel | B01F 3/04801 141/19 |
| 5,407,096 | A * | 4/1995 | Smith | F16K 1/305 137/881 |
| 5,544,670 | A * | 8/1996 | Phillips | B60S 5/04 137/224 |
| 5,590,696 | A * | 1/1997 | Phillips | B60S 5/043 141/19 |
| 5,607,087 | A * | 3/1997 | Wery | B67D 1/0456 222/401 |
| 5,628,350 | A * | 5/1997 | Gibb | B60S 5/043 141/19 |
| 5,855,221 | A * | 1/1999 | Rieckhoff | B60S 5/043 137/2 |
| 5,857,481 | A * | 1/1999 | Zimmerman | B60S 5/043 137/227 |
| 5,884,659 | A * | 3/1999 | Prosser | B60C 25/145 137/223 |
| 6,202,714 | B1 * | 3/2001 | Wang | B60S 5/04 141/301 |
| 7,426,936 | B2 * | 9/2008 | Gessaman | F16J 15/004 137/312 |
| 7,434,593 | B2 * | 10/2008 | Noll | F16K 15/063 137/15.18 |
| 7,878,360 | B2 * | 2/2011 | Takeda | B29C 73/166 137/859 |
| 9,248,416 | B2 * | 2/2016 | Striebinger | B01F 3/04801 |
| 2004/0154693 | A1 * | 8/2004 | Zaiser | A61M 16/00 141/83 |
| 2006/0180207 | A1 * | 8/2006 | Itano | A62C 35/68 137/505.14 |

* cited by examiner

BICYCLE AIR PUMP

BACKGROUND OF THE INVENTION

1. Field of the Invention

The invention relates to bicycle air pumps and more particularly to such a bicycle air pump having improved characteristics.

2. Description of Related Art

A conventional bicycle air pump is shown in FIG. 8 and comprises a discharge member 91 mounted on a cylinder 90. A rider may attach the discharge member 91 to a valve of a bicycle for inflating a tire. However, there is no pressure relief device in the air pump. Thus, it is not safe. Further, the cylinder 90 is for a single use.

Thus, the need for improvement still exists.

SUMMARY OF THE INVENTION

It is therefore one object of the invention to provide a bicycle air pump comprising a cylinder for storing pressurized air; a joining member disposed on a top of the cylinder, the joining member including an upper chamber, an intermediate chamber, a lower chamber, a relief valve, and a passageway communicating the cylinder with both the lower chamber and the relief valve; an activation assembly disposed on a top of the joining member, the activation assembly including a hollow spring-loaded stem disposed in both the intermediate chamber and the lower chamber, a seal at an end, a cap disposed on the upper chamber, a push rod passing through the cap to urge against the seal, the push rod having an axial hole and a lateral hole communicating with the axial hole, a knob secured to both the push rod and the cap, and an outlet; a pressure gauge disposed on the joining member and communicating with the passageway; an inlet assembly secured to a bottom of the cylinder, the inlet assembly including a check valve and a cap member for concealing the check valve; and a blocking member secured to a bottom of the stem for blocking the passageway when in an inoperative position.

The above and other objects, features and advantages of the invention will become apparent from the following detailed description taken with the accompanying drawings.

DETAILED DESCRIPTION OF THE INVENTION

Figure 1:
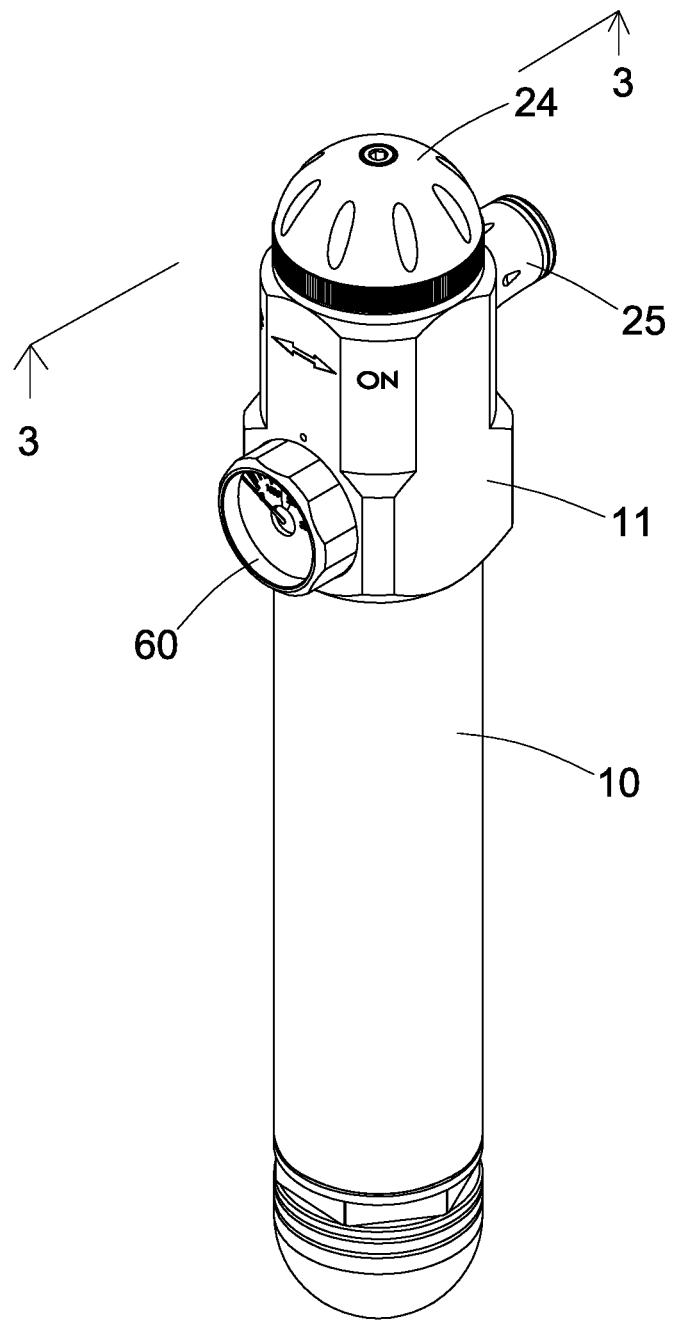
FIG. 1 is a perspective view of a bicycle air pump according to the invention.
Figure 2:
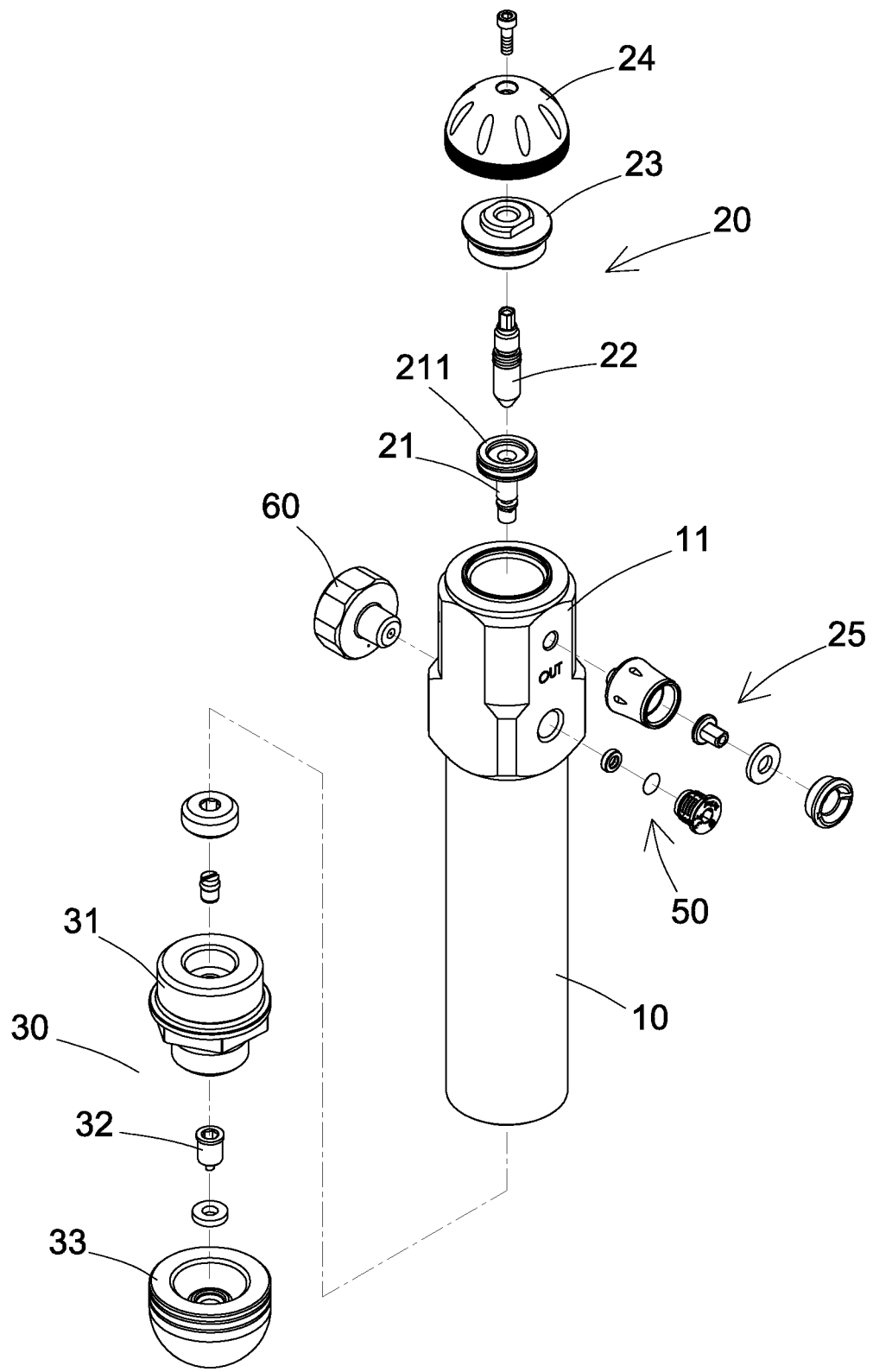
FIG. 2 is an exploded view of the air pump.
Figure 3:
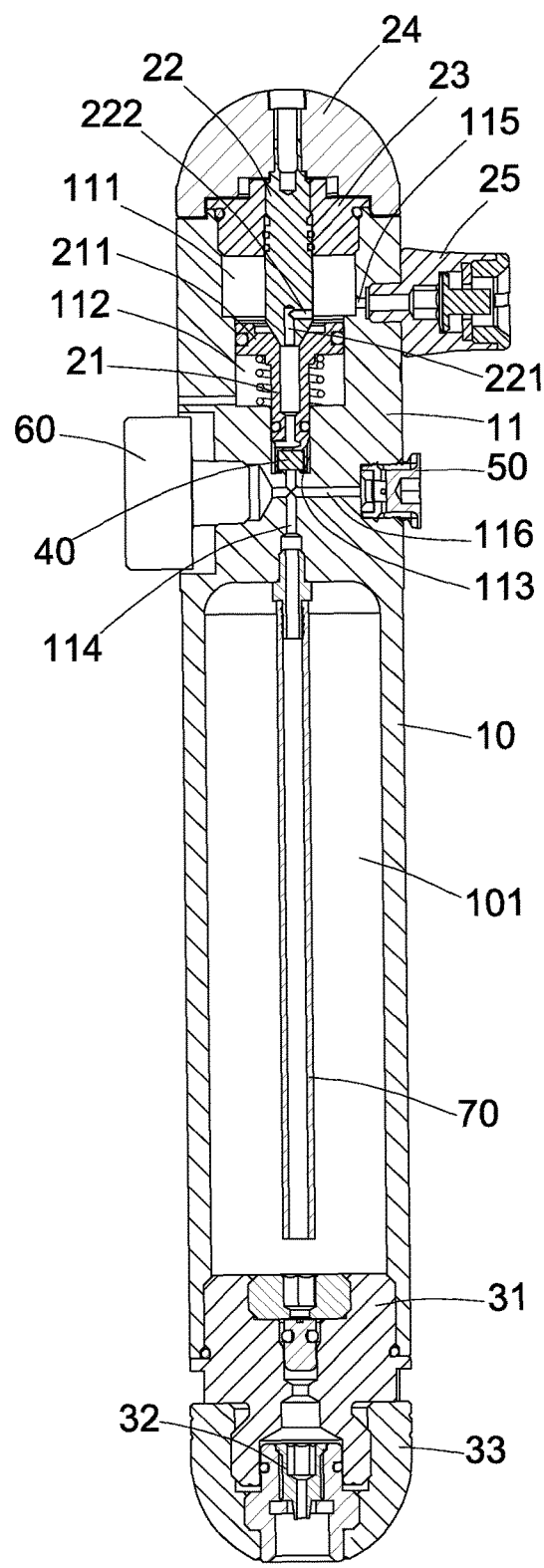
FIG. 3 is a sectional view taken along line 3-3 of FIG. 1.
Figure 4:
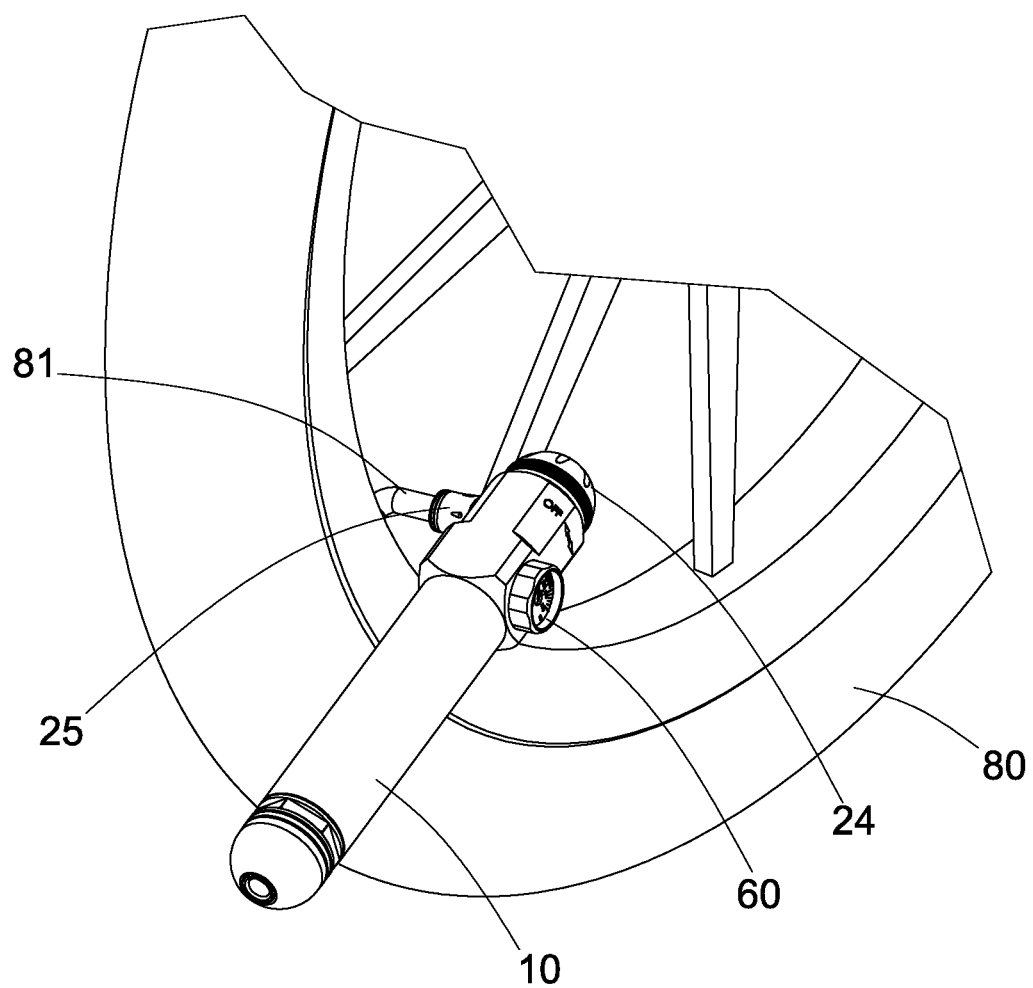
FIG. 4 is a perspective view showing the air pump attached to a bicycle valve.
Figure 5:
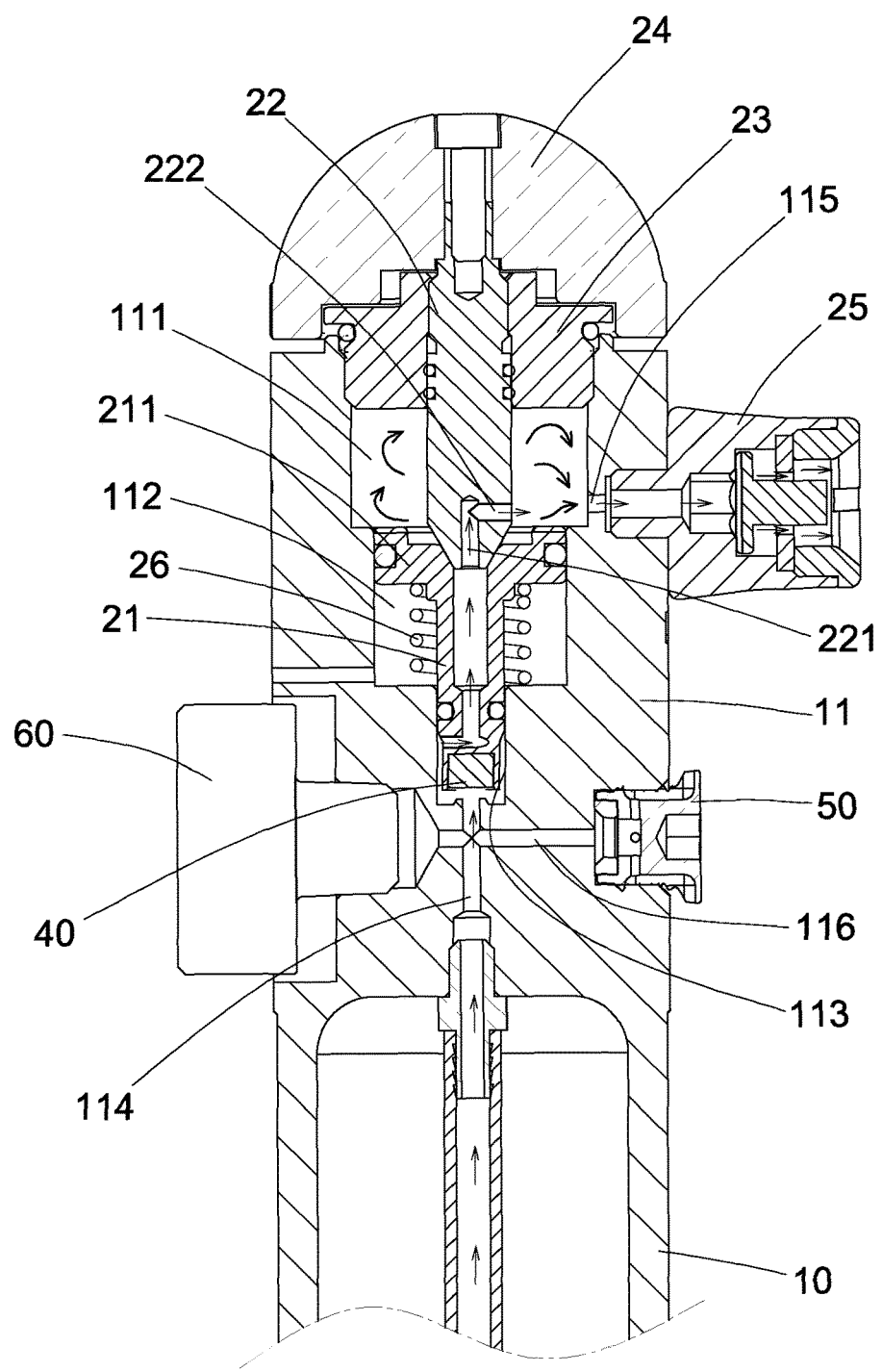
FIG. 5 is a detailed view of upper portion of FIG. 3 showing a tire inflating operation.

Referring to FIGS. 1 to 7, a bicycle air pump of the invention comprises the following components.

A cylinder 10 includes a space 101 and an axial pipe in the space 101. A joining member 11 is on top of the cylinder 10 and includes an upper chamber 111, an intermediate chamber 112, a lower chamber 113, a passageway 114 communicating the pipe 70 with the lower chamber 113, a port 115. A lateral passage 116 has one end communicating with the passageway 114.

An activation assembly 20 is on top of the joining member 11 and includes a hollow stem 21 having a seal 211 on the head, a push rod 22 having an axial hole 221 and a lateral hole 222 communicating with the axial hole 221, a cap 23, a knob 24, and an outlet 25 mounted on the port 115.

The stem 21 is in the intermediate chamber 112 and the lower chamber 113. A spring 26 is put on the stem 21 and has on end urging against bottom of the intermediate chamber 112 and the other end urging against the seal 211. The cap 23 is provided on an upper portion of the upper chamber 111. The push rod 22 is through the cap 23 to urge against the seal 211. The knob 24 is secured to the push rod 22 and the cap 23.

An inlet assembly 30 includes a hollow fastener 31 secured to bottom of the cylinder 10, a cap member 33 secured to the fastener 31, and a check valve 32 in the fastener 31 and the cap member 33. A blocking member 40 is at bottom of the stem 21 to block the passageway 114. A relief valve 50 is on the other end of the passage 116 and can relieve pressure in the cylinder 10 when pressure in the cylinder 10 exceeds a set pressure. A pressure gauge 60 is on the joining member 11 and communicates with the passageway 114 and the passage 116.

For inflating a valve 81 of a bicycle tire 80, a rider may press the outlet 25 onto the valve 81 for fastening. Next, the rider may clockwise turn the knob 24 to move the push rod 22 upward. The compressed spring 26 pushes the seal 211 partially into the upper chamber 111 and moves the stem 21 upward. The blocking member 40 unblocks the passageway 114. Pressurized air in the space 101 flows into the tire 80 via the pipe 70, the passageway 114, the stem 21, the axial hole 221, the lateral hole 222, the upper chamber 111, the port 115, the outlet 25, and the valve 81.

The rider may counterclockwise turn the knob 24 to cause the blocking member 40 to block the passageway 114 after inflating the tire 80.

Figure 6:
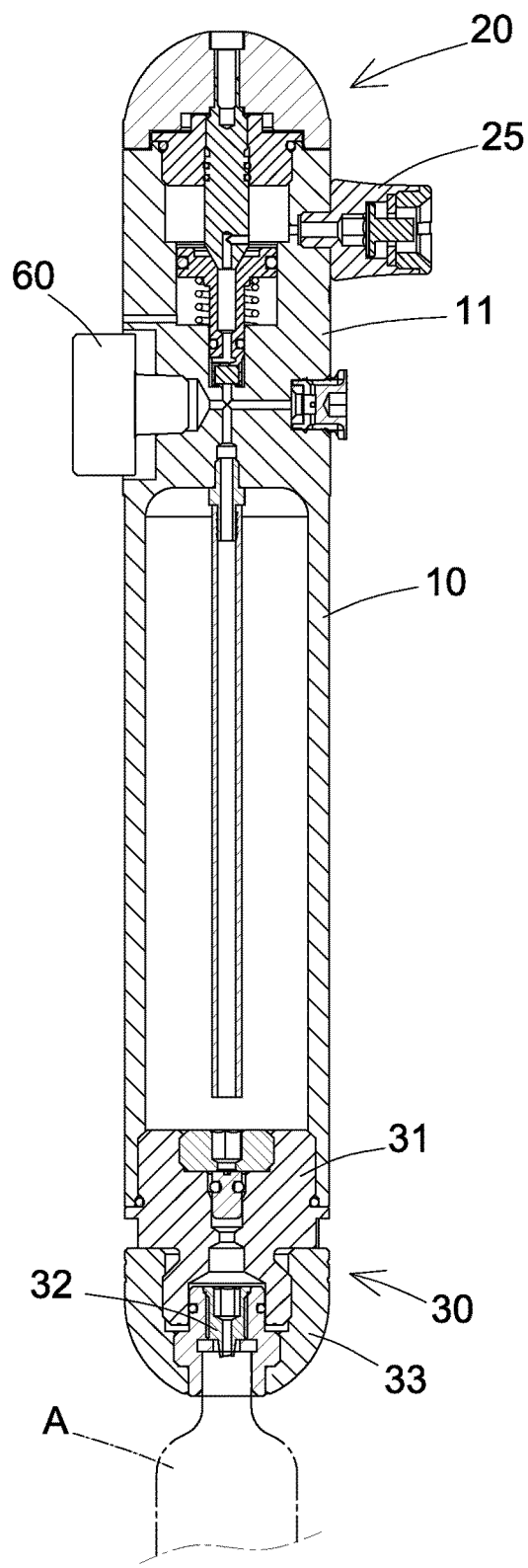
FIGS. 6 and 7 are views similar to FIG. 3 showing a disposable pressure vessel attached to the check valve and a hose attached to the check valve for storing pressurized air in the cylinder respectively.
Figure 7:
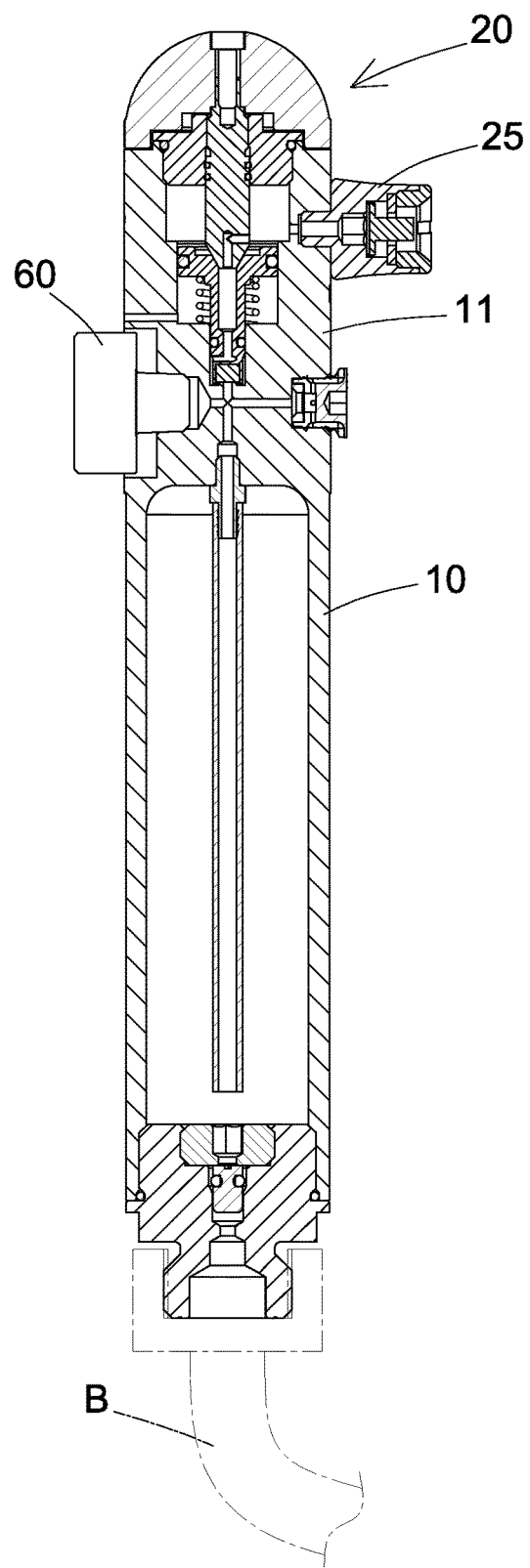
Figure 8:
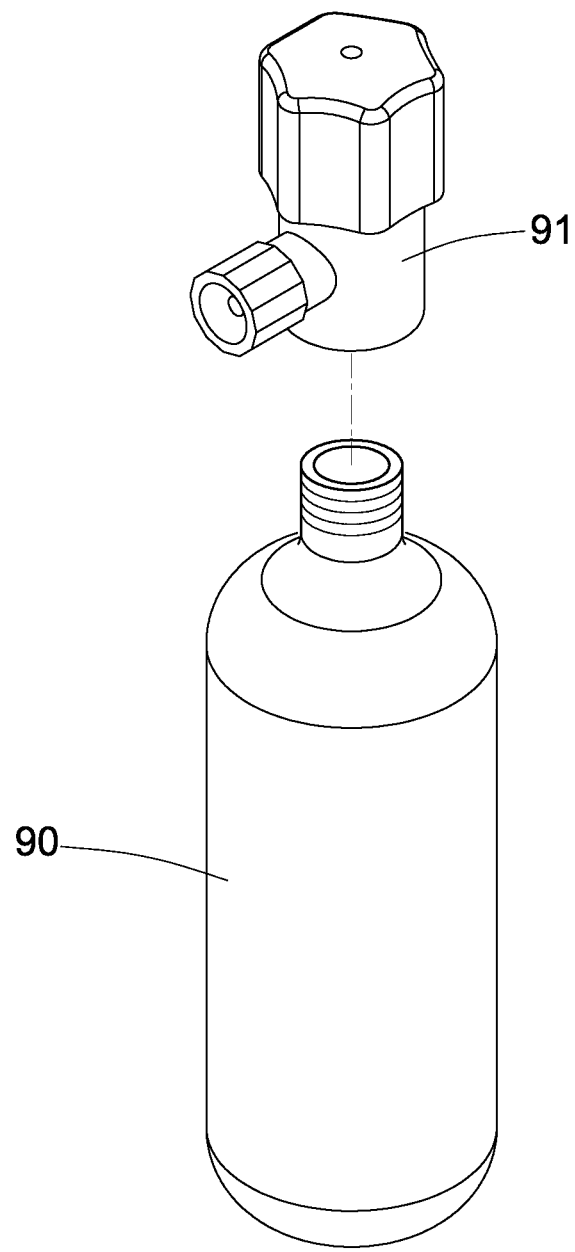
FIG. 8 is an exploded view of a conventional gas cylinder.

For storing pressurized air in the cylinder 10, a disposable pressure vessel A is attached to the check valve 32 (see FIG. 6). Alternatively, a rider may remove the cap member 33 and use a hose B to interconnect the check valve 32 and an air compressor (see FIG. 7).

While the invention has been described in terms of preferred embodiments, those skilled in the art will recognize that the invention can be practiced with modifications within the spirit and scope of the appended claims.

What is claimed is:

1. A bicycle air pump comprising:
   a cylinder for storing pressurized air;
   a joining member disposed on a top of the cylinder, the joining member including an upper chamber, an intermediate chamber, a lower chamber, a relief valve, and a passageway communicating the cylinder with both the lower chamber and the relief valve;
   an activation assembly disposed on a top of the joining member, the activation assembly including a hollow spring-loaded stem disposed in both the intermediate chamber and the lower chamber, a seal disposed at an end, a cap disposed on the upper chamber, a push rod passing through the cap to urge against the seal, the push rod having an axial hole and a lateral hole communicating with the axial hole, a knob secured to both the push rod and the cap, and an outlet;

a pressure gauge disposed on the joining member and communicating with the passageway;

an inlet assembly secured to a bottom of the cylinder, the inlet assembly including a check valve and a cap member for concealing the check valve; and a blocking member secured to a bottom of the stem for blocking the passageway when in an inoperative position;

wherein the knob can be turned in one direction to cause the blocking member to unblock the passageway from the outlet, and can be turned in another direction to cause the blocking member to block the passageway from the outlet.

\* \* \* \* \*